United States Patent [19]

Duvic et al.

[11] Patent Number: 4,743,960
[45] Date of Patent: May 10, 1988

[54] CIRCUIT FOR PRODUCING ANALOG SIGNALS OF PRIMARY COLORS OF A TELEVISION SIGNAL FROM ITS DIGITAL LUMINANCE AND CHROMINANCE COMPONENTS

[75] Inventors: Gérard Duvic; Michel Veillard, both of Rennes; Laurent Paris; Patrice Senn, both of Grenoble, all of France

[73] Assignees: Etat Francais, Les Moulineaux; Telediffusion de France, Montrouge, both of France

[21] Appl. No.: 870,128

[22] Filed: Jun. 3, 1986

[30] Foreign Application Priority Data

Jun. 4, 1985 [FR] France .............................. 85 08406

[51] Int. Cl.$^4$ ..................... H04N 11/04; H04N 9/67
[52] U.S. Cl. ........................................ 358/13; 358/30
[58] Field of Search ............................. 358/13, 30

[56] References Cited

U.S. PATENT DOCUMENTS

| | | | |
|---|---|---|---|
| 4,417,269 | 11/1983 | Dischert | 358/13 |
| 4,419,686 | 12/1983 | Morrison | 358/13 |
| 4,480,271 | 10/1984 | Coleman | 358/13 |
| 4,503,454 | 3/1985 | Lewis | 358/30 |

FOREIGN PATENT DOCUMENTS

| | | |
|---|---|---|
| 0098888 | 1/1984 | European Pat. Off. |
| 0100967 | 2/1984 | European Pat. Off. |
| 0100678 | 2/1984 | European Pat. Off. |

Primary Examiner—John W. Shepperd
Attorney, Agent, or Firm—Michael N. Meller

[57] ABSTRACT

Circuit for producing analog primary signals of a television signal from its digital luminance and chrominance components comprising in series an interpolating digital filter, a digital dematrixer and three digital - analog converters.

The interpolating digital filter carried out an oversampling of the luminance signal Y in a ratio of 2 and an oversampling of each chrominance signal CR, CB in a sampling ratio such that the sampling frequency of the luminance and chrominance digital signals has the same sampling frequency. The digital dematrixer produces the primary digital color signals from the oversampled luminance and chrominance components.

7 Claims, 6 Drawing Sheets

CIRCUIT FOR PRODUCING ANALOG SIGNALS OF PRIMARY COLORS OF A TELEVISION SIGNAL FROM ITS DIGITAL LUMINANCE AND CHROMINANCE COMPONENTS

BACKGROUND OF THE INVENTION

The present invention relates to a circuit for producing analog signals of primary colors RGB (red, green, blue) of a television signal from its digital luminance Y and chrominance CR and CB components.

The invention particularly applies to the reception of television signals transmitted by satellite and to the distribution of television pictures on a local network. These fields require means for the flexible filtering of the components received to take account of variations in time and the location of the reception conditions, particularly in the case of satellite transmission, and the different possible picture sizes and consequently the different possible sampling frequencies of the digital components.

In the field of color television, the acquisition or scanning of a scene is carried out by means of a camera equipped with three analyzer tubes, each corresponding to one of the three primary colors, namely red, green and blue. Conventionally the electric signals produced by these tubes are combined in such a way as to reduce the total band width required for the transmission of said television signal. For this purpose, a luminance signal Y, proportional to the monochrome brightness, and two chrominance signals, signals CR and CB are produced from the red, green and blue signals CR and CB respectively equal R-Y and B-Y normalized to have a range from 0 to 1.

For some years now developments have taken place in the sense of digitizing the luminance and chrominance components produced by the camera, with a view to the digital transmission of the television signal to the receiver and optionally a digital processing of said signal in the receiver. This development has been linked with the appearance of fast VLSI circuits making it possible to replace, at reduced cost and for greater reliability, an important part of the analog functions by their digital equivalent.

Transmission in the form of digital components of the television signal has the advantage of improving the reception quality, accompanied by a greater noise immunity of the transmitted signal. This digitization also permits a greater flexibility of use, particularly for the storage on tape of these signals in broadcasting studios or for the manipulation of said signals ("incrustations", special effects and the like). Finally, said digitization makes it possible to code a scene independently of the standard television system used, such as the NTSC, PAL and SECAM systems.

A circuit for producing primary color signals from digital components of a television signal is known. This circuit comprises a digital-analog converter for carrying out an analog conversion of the digital components, a low-pass filter for attenuating the duplications of the spectra of the components introduced by digitizing said components and a dematrixing member for converting the analog luminance and chrominance signals into primary color signals.

In this circuit, the digital components are firstly converted into analog signals and are then combined to produce the primary color signals. This method suffers from disadvantages. Thus, it is difficult to obtain in a simple manner a linear phase analog low-pass filter, although this feature is essential in video. It is also impossible to modify the template of an analog filter, which limits its flexibility in an environment where there can be variations to the coding parameters (picture size, sampling frequency) and the signal reception conditions. However, with a digital filter, the template of the filter undergoes a simple homothetic transformation as a function of the sampling frequency value, making it possible for the same circuit to be able to process, without any modification, television signals present in the form of digital components, no matter what the values of the sampling frequencies of the chrominance and luminance signals, provided that they remain in the same ratio.

Moreover, the coefficients of the dematrixing member are realized with the aid of resistors. The regulation of these coefficients requires a very careful sorting of the resistors, if it is wished to obtain a precision regarding the value of these coefficients.

To remedy certain disadvantages of analog processing, it has already been proposed to carry out part of the processing of the chrominance signals in digital form. French patent application No. 2 532 504 filed on Aug. 31, 1983 and entitled "Apparatus for improving the signal to noise ratio of the colour channel in a digital television receiver" describes an apparatus for digitally filtering the two chrominance signals by means of a fine pulse response adaptive filter, whose cutoff frequency is a function of the instantaneous frequency spectrum of each chrominance signal.

This adaptive filtering is more flexible than analog filtering in which the cutoff frequency is fixed. The determination of the cutoff frequency $F_c$ is relatively simple because it is a question of increasing the width of the filter if the energy of the chrominance signal received beyond the cutoff frequency $F_c$ exceeds a certain threshold. However, this filtering criterion is not particularly satisfactory because, in certain cases, it can lead to the filtering of a useful part of the chrominance signal.

Digital filtering of the chrominance signal is also proposed in French patent application No. 2 499 343 entitled "Digital chrominance filter for a television system with digital components and filtering process using said filter". This digital filter is designed for oversampling the chrominance signal, so as to obtain a chrominance signal having a sampling frequency identical to that of the luminance signal. This digital filter is also designed for compensating attenuations introduced by certain elements of the receiver, such as the digital-analog converter, or during the digital coding of the chrominance signal on transmission.

SUMMARY OF THE INVENTION

The present invention relates to the simplfication of the carrying out of the filtering and dematrixing functions and of introducing more flexibility in the filtering function. This objective is achieved through the use of a digital processing chain formed from a digital filter followed by a digital dematrixer, the latter supplying digital primary color signals. These signals are then converted into analog signals and act on the television receiver tube.

The digital filter used is a digital interpolating filter, which carries out an oversampling of the luminance signal Y in a ratio of 2 and which oversamples the chrominance signals to bring them to a sampling frequency identical to that of the luminance signal.

The digital interpolating signal is designed so as to compensate the attenuation in $$\frac{\sin x}{x}$$

on the luminance component produced by the digital-analog converters and for greatly attenuating the duplicated spectrum, due to the digitization of each of the components, about their sampling frequencies. This compensation of the attenuation in $$\frac{\sin x}{x}$$

carried out digitally can be reused, no matter what the sampling frequency. However, this flexibility is not permitted by carrying out this compensation in analog form.

The present invention more specifically relates to a circuit for producing primary color signals of a television signal from the digital luminance and chrominance components thereof, wherein said circuit comprises in cascade:

a digital interpolating filter receiving a multiplexed digital signal of said components in which the luminance signal is sampled at frequency $F_E$ and the chrominance signals are sampled at a frequency $F'_E$, a submultiple of $F_E$, the filter supplying a digital luminance signal and over-sampled digital chrominance signals at the same frequency $2F_{E'}$, a digital dematrixer receiving the digital signal supplied by the filter and supplying digital primary color signals, a system of three digital-analog converters, each receiving a digital primary color signal and producing analog primary color signals.

In a preferred manner, the cutoff frequency of the interpolating digital filter is a function of the noise energy in the multiplexed signal. More specifically, it is of interest to apply this principle for chrominance signals, which are those most exposed to noise. The noise energy can be particularly determined, in noise sensor 9 of FIG. 2A, by analyzing the parts of the video signal containing no useful picture informations, such as field blanking, line blanking or the blanking of specific lines. This makes it possible to simplify the construction of the analysis circuit compared with the apparatus described in the aforementioned French patent application No. 2 532 504, whilst still improving the accuracy of the estimate of the noise energy.

Advantageously, the interpolating digital filter has three processing branches, the first branch comprising an interpolating luminance filter followed by a shaping means, the second and third processing branches each comprising in cascade a first interpolating chrominance filter supplying a chrominance signal at the sampling frequency $F_E$, a second interpolating chrominance filter supplying a signal at the sampling frequency $2F_E$ and a shaping means.

Figures 2A, 2B:
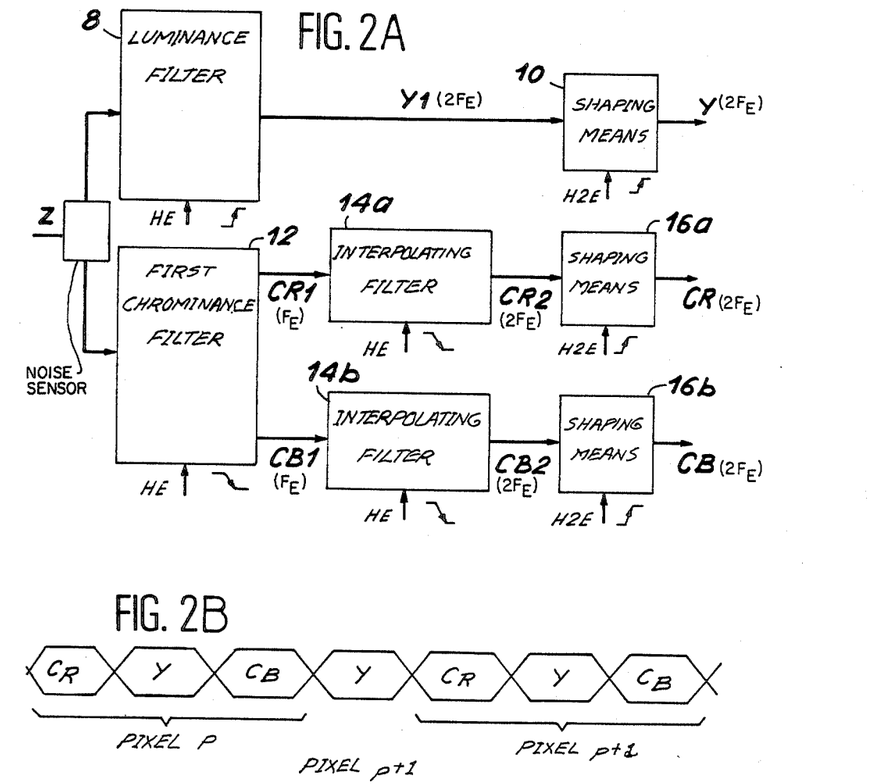
FIG. 2A diagrammatically shows the digital interpolating filter of the circuit according to the invention.
FIG. 2B shows the structure of the multiplexed signal received by the circuit according to the invention.
Figure 2C:
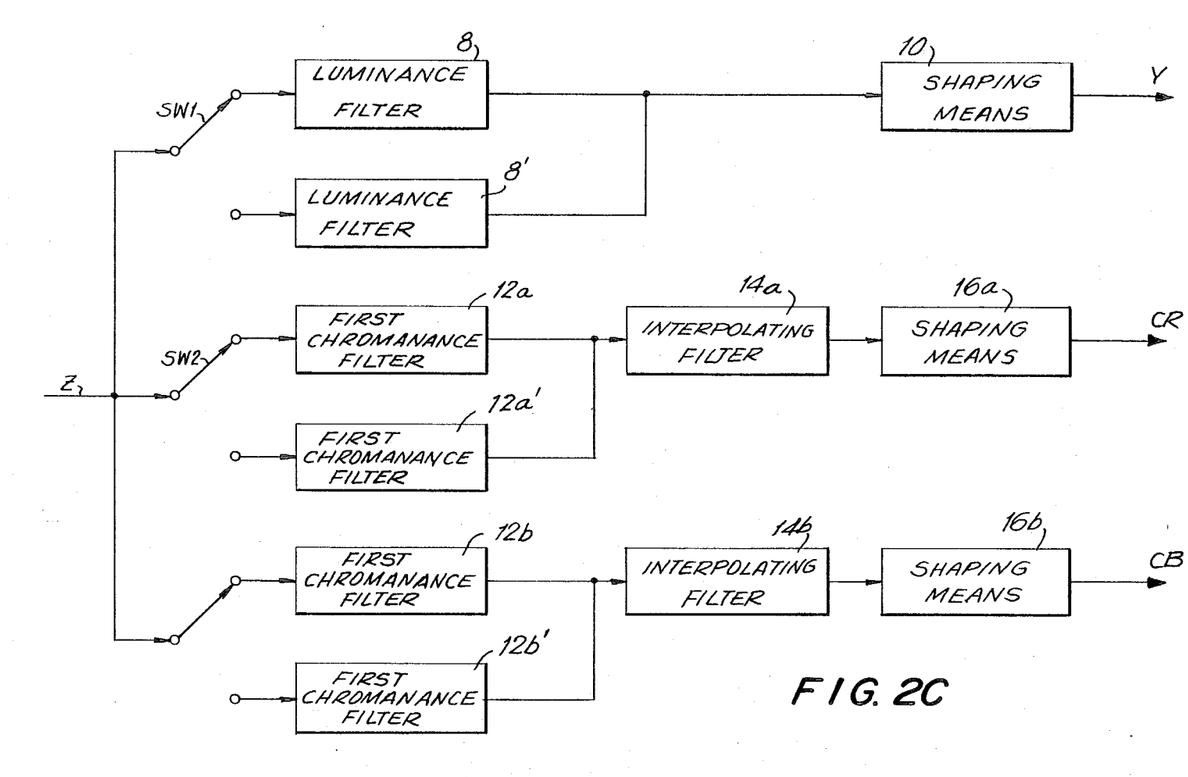

In a preferred manner, each processing branch has several interpolating filters each having a different fixed cutoff frequency, and a switching means for switching to each processing branch the filter whose cutoff frequency $F_c$ is closest to the ideal cutoff frequency determined by the noise energy in the multiplexed signal received, as shown in FIG. 2C.

In a preferred manner, the second interpolating chrominance filter of the second and third processing branches calculates an intermediate value between two successive sampled values of the chrominance signals, said intermediate value being equal to the mean value of said sampled values. The latter carry out filtering with a gentle slope, which permits a better rendering of the picture corresponding to the television signal received.

In a preferred manner and particularly in the case where the production circuit is in the form of a single integrated circuit, the interpolating digital filter can comprise a single first interpolating chrominance filter processing the two chrominance signals, which are multiplexed in time.

In the same way, in the case when the production circuit is in the form of a single integrated circuit, the dematrixer can advantageously comprise means for dividing each operand into several fields, means for carrying out field by field multiplication and means for adding the results of said partial multiplications.

Such a structure is more interesting than a complete multiplier, a system of adders or a multiplication table, particularly because it requires less elements and consequently occupies a smaller area on an integrated circuit.

BRIEF DESCRIPTION OF THE DRAWINGS

The invention is described in greater detail hereinafter relative to non-limitative embodiments and the attached drawings, wherein.

DETAILED DESCRIPTION OF THE PREFERRED EMBODIMENTS

Figure 1:
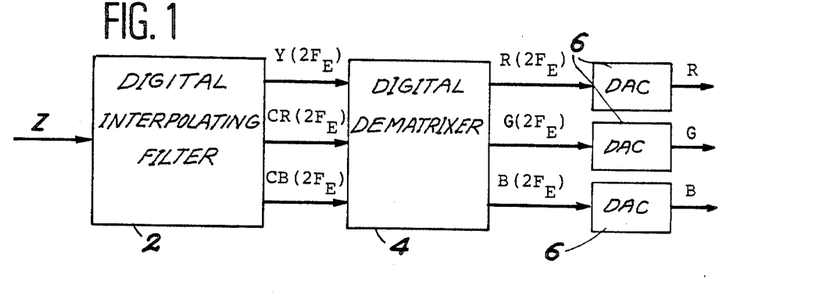
FIG. 1, diagrammatically the structure of the circuit for producing primary color signals according to the invention.

FIG. 1 diagrammatically shows the circuit according to the invention receiving at its input a digital luminance signal Y and two digital chrominance signals CR and CB and which supplies three analog primary color signals R, G and B. This circuit comprises in cascade a digital interpolating filter 2, a digital dematrixer 4 and three digital-analog converters 6.

The digital interpolating filter 2 carries out an oversampling of the luminance signal Y in a ratio of 2. It also oversamples the chrominance signals CR and CB so as to bring their sampling frequency to the same frequency as that of the oversampled luminance signal.

For example in the case of the drawing, the chrominance signals CR and CB received at the input of the digital interpolating filter are sampled at half the frequency of that of the luminance signal. In this case the digital interpolating filter over-samples said chrominance signals in a ratio of 4.

The particular case where the sampling frequency of the chrominance signals is equal to half that of the luminance signal is important. It more particularly conforms with MAC coding (Analog multiplexing by component) used in satellite transmission and defined in document SPB284 of the Union Europeenne de Radiodiffusion (U.E.R). This coding is based on a time compression of the luminance and chrominance signals with the respective compression levels of 1.5 and 3.

In general terms, the sampling frequency of the chrominance signals is a submultiple of the sampling frequency of the luminance signal. This reduced band width for the chrominance signals is made possible by the fact that the eye has a less good sensitivity to transitional color variations compared with brightness variations.

Apart from the oversampling of the luminance and chrominance signals, the digital interpolating filter 2 carries out, in the pass band, a compensation of the attenuation in $$\frac{\sin x}{x}$$

(in which $$x = \frac{\pi F}{2FE})$$

of the digital-analog converters for the luminance signal. It also carries out an attenuation of the spectrum duplications introduced during the digitization on transmission of the chrominance and luminance signals.

The luminance and chrominance signals oversampled at the same sampling frequency are received at the input of the digital dematrixer 4, which produces primary color signals in digital form by linear combination of the luminance and chrominance signals. This operation is the reverse of that which, on transmission, produces luminance and chrominance signals from the primary color signals produced by the analyzer tubes of the television system camera. The matrixing and dematrixing coefficients used can be chosen among those appearing in document 601 of CCIR (Comite Consultatif International de Radiodiffusion).

The digital primary color signals produced by the digital dematrixer have a sampling frequency equal to $2F_E$. As this sampling frequency can reach 27 MHz, the digital-analog conversion of these signals makes it necessary to use digital-analog converters of the flash type. This type of digital-analog converter is well known to the Expert.

It should be noted that the circuit according to the invention is preferably intended for use in the form of a single integrated circuit. In the case of conventional MOS technology, e.g. two solutions are of particular interest for producing digital-analog converters. According to a first structure, the digital-analog converter is constituted by $2^8$ elementary current generators (if each digital luminance or chrominance data is coded on eight bits) controlled by the outputs of a decoder receiving the digital signal and summated at the input of an output amplifier connected in transconductance. According to a second structure, the digital-analog converter can be constituted by a potentiometric divider having $2^8$ outputs, the output corresponding to the binary code received at the input being selected by a decoder and in this case one output amplifier is connected as a follower.

A successive description will now be provided of an embodiment of the digital interpolating filter 2 and an embodiment of the digital dematrixer 4. These embodiments will be directed at obtaining a circuit according to the invention in the form of a single integrated circuit. However, this must not be looked upon as a limitation of the circuit according to the invention, which can also be in the form of a plurality of integrated circuits.

In the following drawings, each connecting line is represented by a single drawing line in order to make the drawings clearer. It is obvious that the lines carrying the digital luminance or chrominance data in reality represent data buses, i.e. a group of lines in parallel.

FIG. 2A shows the structure of the digital interpolating filter. In this embodiment it is assumed that the digital luminance and chrominance signals appear at the filter input in the form of a multiplexed digital signal Z. The shape of this signal is shown in FIG. 2B. The data are alternately luminance data and chrominance data, the latter being alternately data of chrominance signal CR and data of chrominance signal CB.

In this representation, one image point out of every 2, i.e. the even index image points, are represented by a sequence of three data, namely a chrominance data CR, a luminance data Y and a chrominance data CB. The uneven index image points are solely represented by a luminance data Y.

Returning to FIG. 2A, the digital interpolating filter comprises three parallel processing branches. The first processing branch comprises an interpolating luminance filter 8 for oversampling the luminance signal Y in a ratio of 2, followed by a shaping means 10. The second and third processing branches are identical, each comprising a first interpolating chrominance filter 12 for oversampling each of the chrominance signals so as to produce chrominance signals having a sampling frequency identical to that of the luminance signal contained in the multiplexed signal Z, a second interpolating chrominance filter 14A and 14B and a shaping means 16A, 16B.

As shown in the drawing, the first interpolating chrominance filter 12 can advantageously be a single filter sequentially processing the two chrominance signals CR and CB. This solution is of particular interest from the standpoint of an integrated construction of the circuit according to the invention, because it makes it possible to oversample the two chrominance signals with the aid of a single filter. This structure is also adapted to the particular form of the multiplexed signal Z of FIG. 2B. Obviously, in certain applications of the invention, it can be preferable to provide a first interpolating chrominance filter (12a and 12b) on each of the second and third branches, as shown in FIG. 2C.

The processing of data in the digital interpolating filter requires a clock signal He of frequency $F_E$ equal to the sampling frequency of the luminance signal Y in the multiplex signal Z and a clock signal H2E of frequency $2F_E$. These clock signals can be produced by conventional timing recovery methods from the signal received.

The demultiplexing of signal Z can easily be carried out with the aid of the clock signal HE. For example, it is sufficient to use in the interpolating luminance filter 8, active elements on the rising edge of clock HE and to use, for the interpolating chrominance filters 12, 14A and 14B, active elements on the falling edge of said clock HE.

A successive description will now be given of a special embodiment of each of the digital interpolating filter means of FIG. 2A.

In the remainder of the description, the designations $CB_{4n}$, $Y_{4n}$, $CR_{4n}$, $Y_{4n+2}$, in which n is an integer, will be used for each field of four successive data of the multiplexed signal Z and $Y_m$, $CR_m$ and $CB_m$, in which m is an integer. for the data of the digital output signals of the digital interpolating filter. With these notations, the function of the interpolating luminance filter is to calculate the elements $Y_{4n+1}$ and $Y_{4n+3}$, in which n is an integer, and to respectively insert them between $Y_{4n}$ and $Y_{4n+2}$ and between $Y_{4n+2}$ and $Y_{4n+4}$. In the same way, the function of the first interpolating chrominance filter consists of calculating and inserting elements $CR_{4n+2}$, $CR_{4n+4}$, $CB_{4n+2}$ and $CB_{4n+4}$. Finally, the second interpolating chrominance filter calculates and inserts elements $CR_{4n+1}$, $CR_{4n+3}$, $CB_{4n+1}$ and $CB_{4n+3}$.

Figure 3:
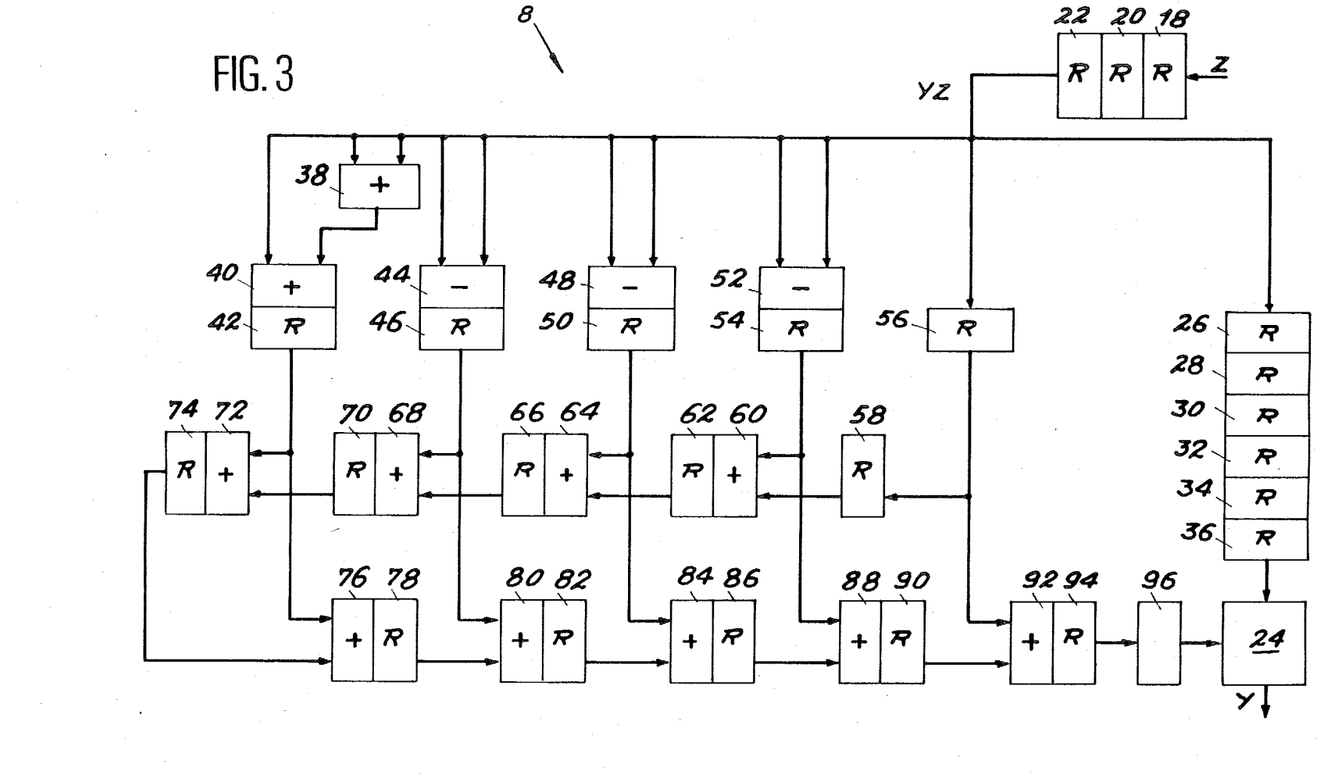
FIG. 3 shows an embodiment of the interpolating luminance filter of the digital interpolating filter.
Figure 4:
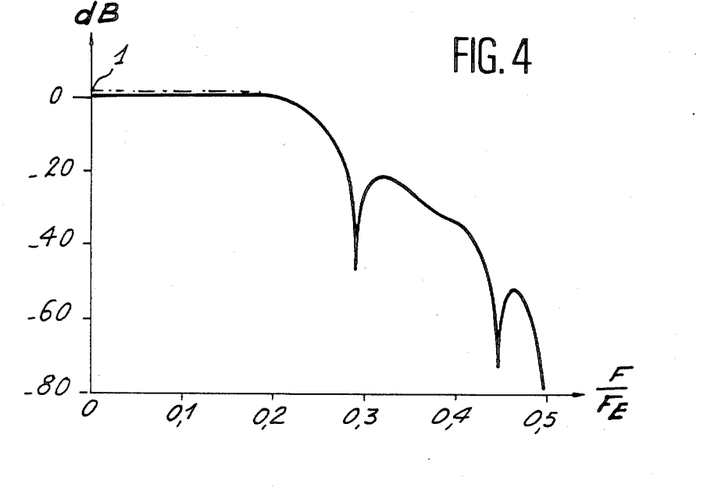
FIG. 4 is a graph showing the transfer function of the interpolating luminance filter of FIG. 3.

The interpolating luminance filter shown in FIG. 3 is a 19th order filter, whose transfer function is equal to:

$$G(z) = a_9 \cdot z^{-27} + a_7 \cdot z^{-25} + a_5 \cdot z^{-23} + a_3 \cdot z^{-21} +$$
$$a_1 \cdot z^{-19} + a_0 \cdot z^{-18} + a_1 \cdot z^{-17} + a_3 \cdot z^{-15} + a_5 \cdot z^{-13} +$$
$$a_7 \cdot z^{-11} + a_9 \cdot z^{-9}, \text{ with } z = e^{-pT}$$

where:
p=j2nf, $$T = \frac{1}{2FE}$$

and
$a_0 = 1$ (in binary notation)
$a_1 = 0.101010$
$a_3 = -0.001111$
$a_5 = 0.000111$
$a_7 = -0.000011$
$a_9 = 0.000001$ This transfer function is defined for the string of data $Y_1$, $Y_2$, $Y_3$, $Y_4$, $Y_5$, etc. in which the even index data string constitutes the digital luminance signal sampled at the frequency $F_E$ received by the filter and in which the uneven index data are zero at the filter input. Preferably, said filter is of the half-band type. In this case, it transmits without modification the even index data and calculates a value for each uneven index data. The interpolating luminance filter of FIG. 3 is realized in accordance with this principle and its frequency gain characteristic is represented on the graph of FIG. 4.

This filter comprises a group of registers, a group of adders, a saturation detection means and a multiplexer. All the registers of this filter are active on the rising edge of the clock signal HE. At the input, the filter comprises a sequence of three registers 18, 20, 22. The first register 18 makes it possible to demultiplex signal Z in such a way as to only collect the luminance data Y. The two other registers simply have the function of delaying the luminance data Y for synchronizing the oversampled luminance and chrominance signals at the input of the digital dematrixer.

Data YZ supplied by register 22 is applied, on the one hand, without processing to one input of the output multiplexer 24 via a sequence of registers 26, 28, 30, 32, 34 and 36 arranged in cascade and is, on the other hand, processed for producing an intermediate value between two samples, said intermediate value being applied to another input of the output multiplexer 24. This intermediate value is determined by the hereinbefore indicated transfer function. The multiplication of a data and a coefficient is carried out by using adders. These coefficients are preferably chosen in such a way as to reduce the complexity of the multiplications, i.e. by limiting the number of bits having the logical value "1".

For the multiplication by coefficient $a_1$, signal YZ is received on the two inputs of an adder 38 and on one input of an adder 40, whose other input is connected to the output of adder 30. The value produced by adder 40 is stored in a register 42. The first input of adder 38 receives data YZ, in which all the bits are displaced by one order to the right (division by two) and the second input receives the same signal in which all the bits are displaced by three orders to the right (division by 8). The first input of adder 40 receives data YZ, in which all the bits are moved by five orders to the right (division by 32). Register 42 then contains the value $a_1 \cdot YZ$.

In the same way, bearing in mind that:
$a_3 = -0.001111 = -0.010000 + 0.000001$,
the value $a_3 \cdot YZ$ can be obtained by subtraction between data YZ, in which each bit is displaced by six orders to the right, and data YZ, in which each bit is displaced by two orders to the right. This value is consequently produced by a single subtracter 44 and is stored in a register 46.

In the same way, bearing in mind that:
$a_5 = 0.000111 = 0.001000 - 0.000001$ and
$a_7 = -0.000011 = -0.000100 + 0.000001$,
the values $a_5 \cdot YZ$ and $a_7 \cdot YZ$ are respectively obtained by means of a subtracter 48, 52 and are respectively stored in registers 50, 54. Finally, value $a_9 \cdot YZ$ is easily obtained by the displacement of data item YZ and is stored in a register 56.

The filter comprises other adders and other registers for adding the different coefficients stored in registers 42, 46, 50, 54 and 56. It comprises a register 58 whose input is connected to the output of register 56, an adder 60 whose inputs receive the data stored in registers 54 and 58, a register 62 for storing the data produced by adder 60, an adder 64 whose inputs are connected to registers 50 and 62, a register 66 for storing the data produced by adder 64, an adder 68 whose inputs are connected to registers 46 and 66, a register 70 for storing the data produced by adder 68, and adder 72 whose inputs are connected to registers 42 and 70, a register 74 for storing the data produced by adder 72, an adder 76 whose inputs are connected to register 42 and to register 74, a register 78 for storing the data produced by adder 76, an adder 80 whose inputs are connected to registers 46 and 78, a register 82 for storing the data produced by adder 80, an adder 84 whose inputs are connected to register 50 and 82, a register 86 for storing the data produced by adder 84, an adder 88 whose inputs are connected to registers 54 and 86, a register 90 for storing the data produced by adder 88, an adder 92 whose inputs are connected to registers 56 and 90, and a register 94 for storing the data produced by adder 92.

Register 94 is followed by a saturation detection means 96 for truncating and saturating the data item received on 8 bits (if the data contained in the multiplexed signal Z, are coded on 8 bits). The output of this saturation detection means is connected to an input of the output multiplexer 24, which is controlled in known manner by a clock derived from clock signal HE. It supplies a luminance data sequence containing the luminance data sequence extracted from signal Z between each of which is inserted an intermediate value calculated by the above-described filter.

The first interpolating chrominance filter has a structure similar to that of the interpolating luminance filter. In the particular case described, where the chrominance signals CR/CB are sampled at a frequency which is half that of the luminance signal Y (FIG. 2B), the first interpolating chrominance filter shown in FIG. 5 carries out an oversampling of each of the chrominance signals in a ratio of 2.

Figure 5:
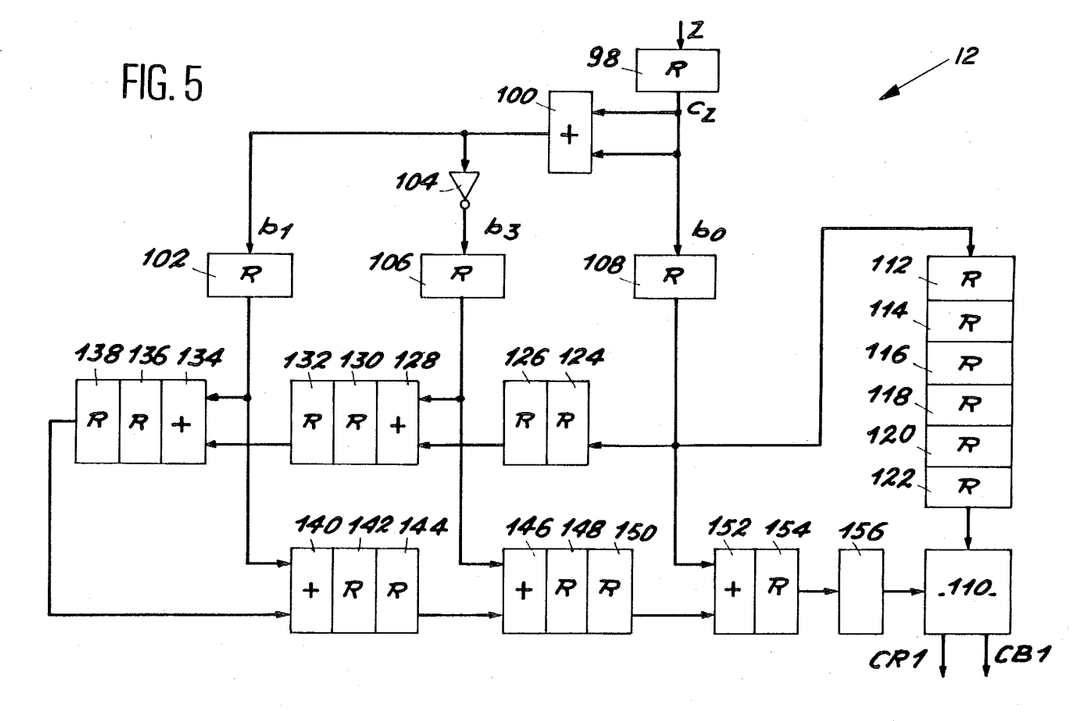
FIG. 5 shows an embodiment of the first interpolating chrominance filter of the digital interpolating filter.

The first interpolating chrominance filter 12 shown in FIG. 5 is a half-band filter of the 11th order, whose transfer function is $$G(z) = b_5 \cdot z^{-26} + b_3 \cdot z^{-22} + b_1 \cdot z^{-18} + b_0 \cdot z^{-16}$$
$$+ b_1 \cdot z^{-14} + b_3 \cdot z^{-10} + b_5 \cdot z^{-6}, \text{ with } z = e^{-pT}$$

where:
$p = j2\pi f$, $$T = \frac{1}{2FE}$$

and
$b_0 = 1$ (in binary notation)
$b_1 = 0.10100$
$b_3 = -0.00101$
$b_5 = 0.00001$ This transfer function is defined for the data strings $CR_1, CR_2, CR_3, CR_4 \ldots$ and $CB_1, CB_2, CB_3, CB_4$ etc. in which the data of index $4n$ ($n$ being an integer) constitute the digital chrominance signals sampled at the frequency $F_E/2$ received by the filter and in which the data of index $4n+1$, $4n+2$ and $4n+3$ are zero at the filter input. Without modification, this filter transmits the data of index $4n$ and calculates a value for each data item of index $4n+2$.

All the registers of the filter of FIG. 5 are active on the falling edge of clock signal HE. The data CR and CB processed by this filter are multiplexed in time, so that one cycle out of every two of clock signal HE will be devoted to each of the chrominance components. It is for this reason that two registers are placed at the output of each adder, whereas there was only one in the luminance interpolating filter.

The filter shown in FIG. 5 is provided at the input with a register 96 making it possible to extract the chrominance data CR and CB from the multiplexed signal Z. Signal CZ stored in this register is multiplied by each of the transfer function coefficients. This is realized as in the luminance interpolating filter by means of adders.

The signal CZ divided by two by the shifting of its bits by one order is applied to a first input of an adder 100, whose other input receives signal CZ divided by eight by shifting its bits by three orders. The signal produced by the adder is equal to $b_1.CZ$ and is stored in a register 102. The signal supplied by adder 100 is inverted in an inverter 104 and stored in a register 106 after division by 4 by shifting its bits by two orders. This register consequently contains the value $b_3.CZ$ (because $b_3 = -b_1 : 4$). The data item CZ is also transmitted to a register 108.

The output of register 108 is connected, on the one hand to one input of an output multiplexer 110, via a sequence of registers 112, 114, 116, 118, 120, 122 arranged in cascade and, on the other hand, to the input of a first register 124 of a sequence of two registers 124, 126. Register 124 contains the value $b_5.CZ$ obtained from the data item CZ contained in register 108 by shifting its bits by five orders.

The filter also comprises an adder 128, whose inputs are connected to registers 106 and 126, said adder being followed by two registers 130, 132, an adder 134 whose inputs are connected to the outputs of registers 102 and 132, said adder being followed by two registers 136, 138, an adder 140 whose inputs are connected to registers 102 and 138, said adder being followed by two registers 142, 144, an adder 146 whose inputs are connected to registers 106 and 144, said adder being followed by two registers 148, 150, an adder 152 whose inputs are connected to registers 108 and 150, said adder being followed by a register 154.

The output of register 154 is connected to one input of the output multiplexer 110 via saturation detection means 156, which truncates and saturates on 8 bits (in the case where the data contained in the multiplexed signal Z are on 8 bits) the data item supplied by register 154. The output multiplexer 110 is controlled in known manner by a clock signal derived from the clock signal HE to produce on two outputs the two chrominance signals CR and CB at a sampling frequency $F_E$.

Each of these signals is then again oversampled in a ratio of 2 by a second interpolating chrominance filter. These have an identical transfer function equal to:

$$G(z) = C_1 \cdot z^{-3} + C_0 \cdot z^{-2} + C_1 \cdot z^{-1}$$
with $z = e^{pT}$ and $C_0 = 1$ $C_1 = 0.1$ For each chrominance signal, this transfer function corresponds to the calculation and insertion of an intermediate data item, between two consecutive data items, said intermediate data being equal to the mean value between these consecutive data. Thus, the structure of each of these filters is very simple. An embodiment of these filters 14A, 14B is given in FIGS. 7A, 7B respectively for the chrominance signals CB and CR.

Figure 6:
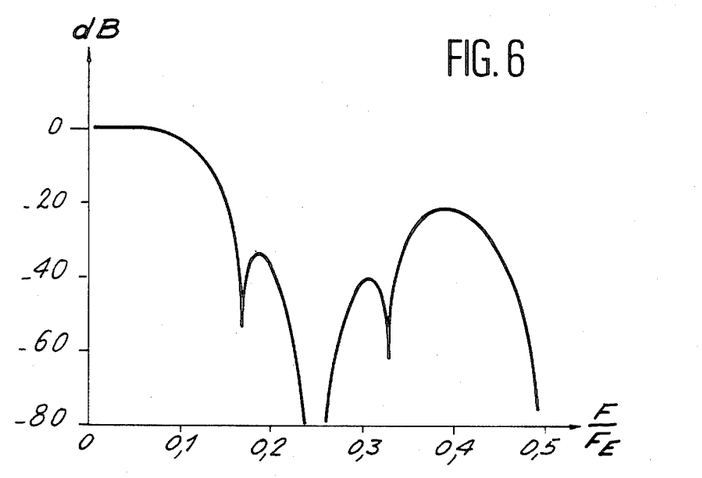
FIG. 6 is a graph showing the product of the transfer function of the first interpolating chrominance filter and the transfer function of the second interpolating chrominance filter.

The frequency gain characteristic of the first chrominance filter 12, associated either with the averaging filter 14A or with the averaging filter 14B, is given in FIG. 6.

Figure 7A:
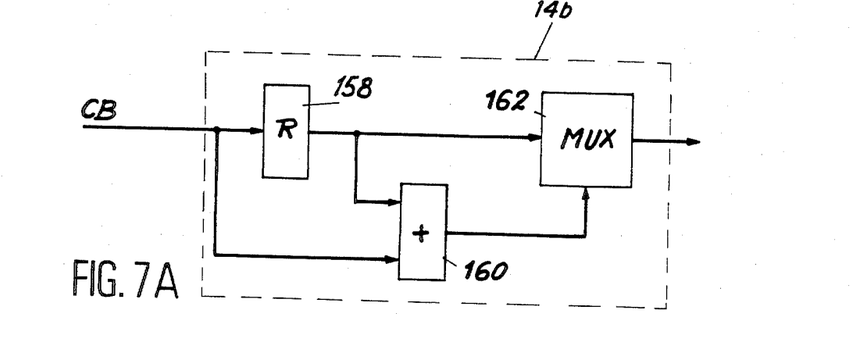
FIGS. 7A and 7B show an embodiment of the second interpolating chrominance filter for each of the two chrominance signals.

The second interpolating filter of the chrominance signal CB shown in FIG. 7A comprises register 158 receiving the signal CB supplied by the first interpolating chrominance filter, an adder 160 whereof one input is connected to the output of register 158 and whereof the other input is connected to the input of said register, and a multiplexer 162 whereof one input is connected to the output of register 158 and whereof the other input is connected to the output of adder 160. The connections on the inputs of adder 160 are such that they divide by two the data applied to the inputs thereof.

Figure 7B:
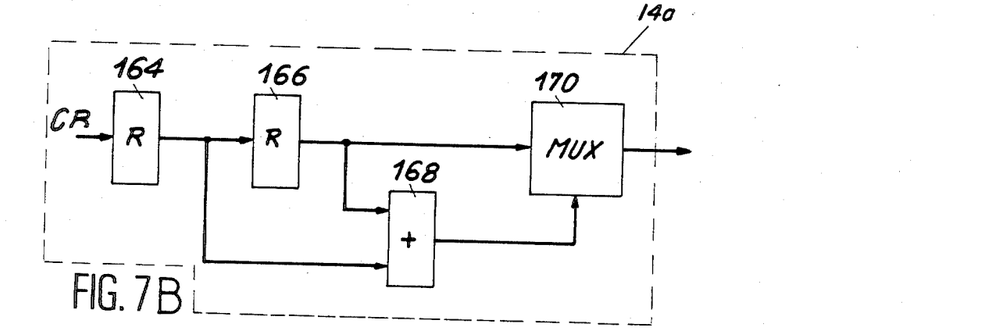

The second interpolating filter of the chrominance signal CR shown in FIG. 7B has an identical architecture to that of the filter of FIG. 7A. It comprises a register 166, an adder 168 and a multiplexer 170 forming an identical processing circuit to that of FIG. 7A. It also comprises at the input a register 164 for delaying the chrominance signal CR by one cycle of signal HE, in order to synchronize the two chrominance signals.

At the output of said second interpolating chrominance filters, the chrominance signals have a sampling frequency $2F_e$ equal to the sampling frequency of the luminance signal supplied by the interpolating luminance filter. Moreover, these three signals are synchronized with one another by means of registers 20, 22 (FIG. 3) and register 164 (FIG. 7B). Each of the three signals is received in a shaping means (10, 16A, 16B in FIG. 2A) before being applied to the inputs of the digital dematrixer.

Figure 8:
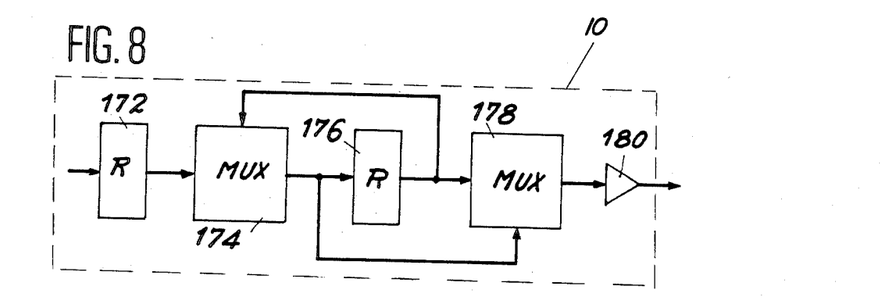
FIG. 8 shows an embodiment of the shaping means for each processing branch of the interpolating digital filter.

FIG. 8 illustrates an embodiment of each of these shaping means. It comprises in series a register 172, a multiplexer 174, a register 176, a multiplexer 178 and an amplifier 180. Multiplexer 174 is provided with a first input connected to the output of register 172 and a second input connected to the output of register 176. Multiplexer 178 is provided with a first input connected to the output of register 176 and a second input connected to the output of multiplexer 174. The registers of said shaping means are active on the rising edge of clock signal H2E.

This shaping means ensures the maintaining of a data item in the case of a leaving sample which is considered to be incorrect. Thus, both on the luminance and on the chrominance, the calculation of a leaving sample is carried out on the basis of entering samples distributed over six consecutive frames of the multiplexed signal Z. If one of the six fields is not valid, particularly at the start and finish of the television signal line, the calculation of the samples will give an incorrect and a priori unpredictable result. Any calculated leaving sample considered to be incorrect will consequently be replaced by the immediately preceding uncalculated sample, independently of the validity thereof.

The maintaining of a data item is controlled by a VALY signal for luminance and by a VALC signal for the chrominance. These signals are processed from an external validation signal, which is sampled on each multiplexed frame Z.

This shaping means also ensures, the bringing about or not, as a function of the external control signal, of a lag equal to one cycle of clock H2E on the entering data (Y1, CR2, CB2). Thus, if the sampling structure of the luminance signal has been chosen in "field-quincunx structure", it is necessary to delay signals Y1, CR2 and CB2 by a clock cycle H2E, alternately from one video field to the next. If the sampling structure is orthogonal, said delay or lag is not necessary.

Figure 9:
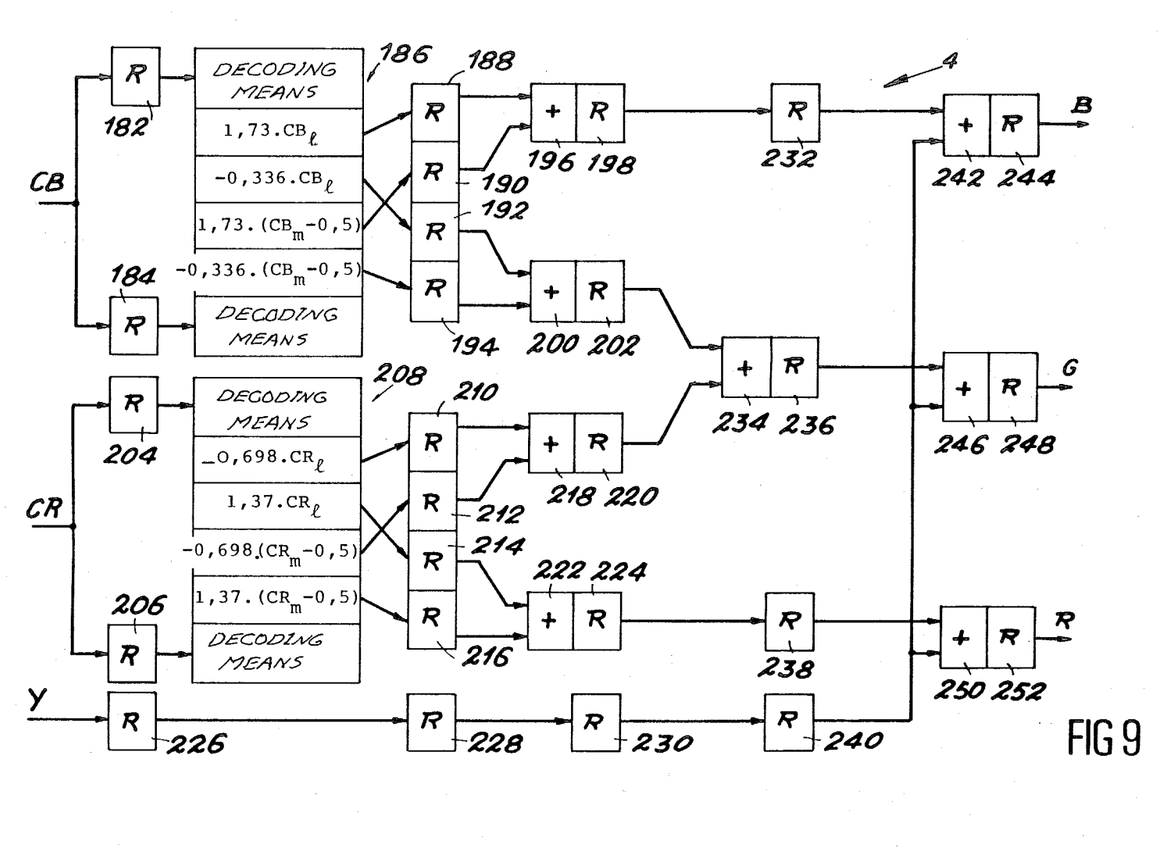
FIG. 9 shows an embodiment of the dematrixer of the circuit according to the invention.

FIG. 9 illustrates an embodiment of the digital dematrixer receiving the digital luminance Y and chrominance CR and CB components sampled at frequency $2F_E$. This dematrixer supplies the digital primary color signals B, G and R by linear combination between the signals received at the input in accordance with the following equation system:

$$R = +1.000 \cdot Y + 1.370 \cdot (CR\text{-}0.5) + 0.000 \cdot (CB\text{-}0.5)$$

$$G = +1.000 \cdot Y - 0.698 \cdot (CR\text{-}0.5) - 0.336 \cdot (CB\text{-}0.5)$$

-continued
$$B = +1.000 \cdot Y + 0.000 \cdot (CR\text{-}0.5) + 1.730 \cdot (CB\text{-}0.5)$$

The multiplication of each input component by a fixed coefficient can be carried out in different ways. This can e.g. be carried out by a complete multiplier, by a system of adders wired as a function of said fixed coefficient, by a multiplication table or by the division of each operand into several fields, partial multiplications of these fields and final addition.

The use of a complete multiplier is expensive because it leaves resources unused, the multiplier being able to carry out the multiplication of two random numbers. The system of adders is used for the interpolating luminance filter and for the first interpolating chrominance filter shown in FIGS. 3 and 5. This method is only usable if the fixed coefficient is relatively simple, i.e. is constituted by few bits 1 or −1. The use of a multiplication table, e.g. in the form of a programmed, prebroadcast network has a cost which increases exponentially with the number of bits of the operand.

When the fixed coefficients are complex, as is the case in the dematrixer according to the invention, the most advantageous solution is consequently to divide each operand into several fields, multiply these operands field by field and add the results of these partial multiplications.

The digital dematrixer shown in FIG. 9 functions according to this principle. Each chrominance data item received at the input and coded on 8 bits is broken down into two fields of in each case 4 bits. For a data item of the chrominance signal CB, the 4 least significant bits $CB_1$ are stored in a register 182 and the 4 most significant bits $CB_m$ in a register 184. These data are received in a programmed logic network 186. It supplies at the output the product $1.73CB_1$ stored in a register 188 and the product $1.73 (CB_m-0.5)$ stored in a register 190. It also supplies to a register 192 the product $0.336CB_1$ and to a register 194 the product $-0.336 (CB_m-0.5)$. The data contained in registers 188 and 190 are added in an adder 196, whose output signal is in a register 198. In the same way, the data contained in registers 192 and 194 are received in an adder 200, whose output signal is stored in a register 202.

The processing of a chrominance signal data item CR takes place identically. The 4 least significant bits $CR_1$ are stored in a register 204 and the 4 most significant bits $CR_m$ in a register 206. The output of each of these registers is connected to one input of a programmed logic network 208, which supplies to a register 210 the product $0.698CR_1$, to a register 212 the product $-0.698 (CR_m-0.5)$, to a register 214 the product $1.37CR_1$ and to register 216 the product $1.37 (CR_m-0.5)$. The content of registers 210 and 212 is added in an adder 218, whose output is connected to a register 220. In the same way, the contents of registers 214 and 216 are added in an adder 222, whose output is connected to a register 224.

The digital dematrixer also comprises registers 226, 228 and 230 in series for synchronizing the luminance signal contained in registers 198, 202, 220 and 224.

It also comprises a register 232 downstream of register 198, an adder 234 followed by a register 236, which receives on its inputs the content of registers 202 and 220, a register 238 downstream of register 224 and a register 240 downstream of register 230. It finally comprises an adder 242, whose inputs are connected to registers 232 and 240, said adder being followed by a register 244 supplying the digital blue primary color signal; an adder 246 whose inputs are connected to registers 236 and 240, said adder being followed by a register 248 which supplies the digital green color signal; and an adder 250 whose inputs are connected to registers 238 and 240, said adder being followed by a register 252 which supplies the digital red color signal.

The digital primary color signals supplied by registers 244, 248 and 252 are then processed, each by a digital-analog converter, as described relative to FIG. 1, in order to produce the analog primary color signals.

We claim:

1. A circuit for producing primary color signals of a television signal from the digital luminance and chrominance components thereof, wherein said circuit comprises in cascade: a digital interpolating filter receiving a multiplexed digital signal of said components in which the luminance signal is sampled at frequency $F_E$ and the chrominance signals at a frequency $F'_E$, a submultiple of $F_E$, the filter supplying a digital luminance signal and over-sampled digital chrominance signals at the same frequency $2F_E$, a digital dematrixer receiving the digital signal supplied by the filter and supplying digital primary color signals, a system of three digital-analog converters, each receiving a digital primary color signal and producing analog primary color signals.

2. A circuit according to claim 1, wherein the cutoff frequency of the digital filter is a function of the noise energy in the multiplexed signal.

3. A circuit according to claim 2, wherein it comprises a group of switchable chrominance and/or luminance interpolating filters, each filter having a different cutoff frequency, and a switching means for choosing a filter as a function of the noise energy in the multiplexer signal.

4. A circuit according to claim 1, wherein the digital interpolating filter has three processing branches receiving the multiplexed digital signal and respectively supplying the luminance signal and the chrominance signal, the first processing branch comprising an interpolating luminance filter followed by a shaping means, the second and third processing branches in each case comprising in cascade a first interpolating chrominance filter supplying a signal at the sampling frequency $F_E$, a second interpolating chrominance filter supplying a signal at frequency $2F_E$ and a shaping means.

5. A circuit according to claim 4, wherein the digital interpolating filter comprises a single first interpolating chrominance filter processing the two chrominance signals, which are multiplexed in time.

6. A circuit according to claim 1, wherein the second interpolating chrominance filter of the second and third processing branches calculates an intermediate value between two successive samples equal to the mean value of said sampled values.

7. A circuit according to claim 1, wherein it is realized in the form of an integrated circuit on a single substrate.

* * * * *